United States Patent
Hall

(10) Patent No.: US 8,070,132 B2
(45) Date of Patent: Dec. 6, 2011

(54) FLUID CONTROL DEVICE WITH A NON-CIRCULAR FLOW AREA

(75) Inventor: Matthew Charles Everard Hall, Littleton, CO (US)

(73) Assignee: Norgren, Inc., Littleton, CO (US)

( * ) Notice: Subject to any disclaimer, the term of this patent is extended or adjusted under 35 U.S.C. 154(b) by 432 days.

(21) Appl. No.: 12/301,640

(22) PCT Filed: Jun. 19, 2006

(86) PCT No.: PCT/US2006/023782
§ 371 (c)(1),
(2), (4) Date: Nov. 20, 2008

(87) PCT Pub. No.: WO2007/149076
PCT Pub. Date: Dec. 27, 2007

(65) Prior Publication Data
US 2009/0108228 A1      Apr. 30, 2009

(51) Int. Cl.
*F16K 1/00*    (2006.01)
(52) U.S. Cl. .................................. 251/333; 251/318
(58) Field of Classification Search .................. 251/318, 251/333
See application file for complete search history.

(56) References Cited

U.S. PATENT DOCUMENTS

| 4,828,184 | A | 5/1989 | Gardner et al. |
| 6,135,523 | A * | 10/2000 | Pratt ........................... 294/68.25 |
| 6,286,880 | B1 * | 9/2001 | Pratt ........................... 294/68.25 |
| 6,367,770 | B1 | 4/2002 | Duelli |
| 6,748,610 | B2 * | 6/2004 | Zach et al. ..................... 4/227.1 |
| 7,032,879 | B2 * | 4/2006 | Hayashi ................... 251/129.09 |

FOREIGN PATENT DOCUMENTS

| DE | 4104019 C1 | 4/1992 |
| DE | 4331851 A1 | 3/1995 |
| DE | 19522284 A1 | 1/1997 |
| EP | 0354659 A2 | 2/1990 |
| FR | 2636399 A1 | 3/1990 |
| GB | 308142 A | 3/1929 |
| JP | 2002168398 A | 6/2002 |

* cited by examiner

*Primary Examiner* — John Fristoe, Jr.
(74) *Attorney, Agent, or Firm* — The Ollila Law Group LLC

(57) ABSTRACT

A fluid control device with a non-circular flow passageway is disclosed. The fluid control device has an inlet port (318) formed on a first side (314) of a fluid control body. A valve cavity (320) is formed in the bottom of the fluid control body. The inlet port is coupled to the valve cavity with an inlet port opening. A valve seat (316) is formed in the valve cavity with a non-circular shaped valve seat passageway (310). An outlet port (306) is formed on a second side (312) of the fluid control body. The outlet port is coupled to the non-circular shaped valve seat passageway (310) by an outlet port passageway (308).

20 Claims, 9 Drawing Sheets

FLUID CONTROL DEVICE WITH A NON-CIRCULAR FLOW AREA

BACKGROUND OF THE INVENTION

1. Field of the Invention

The invention is related to the field of fluid control devices, and in particular, to a fluid control device with a non-circular flow area.

2. Description of the Prior Art

Traditionally all flow areas in fluid control devices have been round. This is due, in part, to the round pipe threads used to connect these types of products and also due to round features being easier to manufacture than other profiles. The flow through the fluid control device is proportional to the cross-sectional area of the round through hole in the body sealed off by a valve. However the diameter of the through hole and therefore its cross-sectional area is limited by the available port to port distance.

Therefore there is a need for a fluid control device with a higher flow rate for a given port-to-port distance.

SUMMARY OF THE INVENTION

A fluid control device with a non-circular flow passageway is disclosed. The fluid control device has an inlet port formed on a first side of a fluid control body. A valve cavity is formed in the bottom of the fluid control body. The inlet port is coupled to the valve cavity with an inlet port opening. A valve seat is formed in the valve cavity with a non-circular shaped valve seat passageway. An outlet port is formed on a second side of the fluid control body. The outlet port is coupled to the non-circular shaped valve seat passageway by an outlet port passageway.

ASPECTS

One aspect of the invention includes, a fluid control device, comprising:

a fluid control body having a first side, the first side having an inlet port;

the fluid control body having a bottom side where the bottom side forms a valve cavity and where the inlet port is coupled to the valve cavity with an inlet port opening, a valve seat formed in the valve cavity, the valve seat having a non-circular shaped valve seat passageway and where the valve seat passageway couples to the valve cavity;

the fluid control body having a second side where the second side has an outlet port and where the outlet port is coupled to the valve seat passageway with a outlet port passageway.

Preferably, the non-circular shape of the non-circular shaped valve seat passageway is selected from the group: ovals, ellipses, rectangles, rounded rectangles, lenses and stadiums.

Preferably, the outlet port passageway has a non-circular shape.

Preferably, the outlet port passageway has generally the same shape as the non-circular shaped valve seat passageway.

Preferably, the inlet port opening has a non-circular shape.

Preferably, the inlet port opening is generally circular with a flat side on a top side of the inlet port opening.

Preferably, the non-circular shaped valve seat passageway has a long axis and where the long axis is parallel to the first side.

Preferably, the first side is opposite the second side.

Preferably, the valve seat has a wall thickness between an outer edge of the valve seat and the non-circular shaped valve seat passageway and where the wall thickness is non-uniform.

Preferably, a valve configured to seal against the valve seat.

Preferably, a non-circular sealing gasket configured to form a seal between the valve and the non-circular shaped valve seat passageway.

Preferably, the valve has a circular shape.

Preferably, the non-circular shaped valve seat passageway is shaped like a stadium and the stadium has a length that is at least twice as long as a width of the stadium shaped valve seat passageway.

Another aspect of the invention comprises a method of manufacturing a fluid control device, comprising:

forming a fluid control body having a first side, the first side having an inlet port;

forming a valve cavity in a bottom of the fluid control body where the inlet port is coupled to the valve cavity with an inlet port opening, forming a valve seat in the valve cavity, the valve seat having a non-circular shaped valve seat passageway and where the valve cavity is coupled to the non-circular shaped valve seat passageway;

forming an outlet port in a second side of the fluid control body where the outlet port is coupled to the valve seat passageway with a outlet port passageway.

Preferably, the method further comprises the non-circular shape of the non-circular shaped valve seat passageway is selected from the group: ovals, ellipses, rectangles, rounded rectangles, lenses and stadiums.

Preferably, the method further comprises the outlet port passageway has a non-circular shape.

Preferably, the method further comprises the outlet port passageway has generally the same shape as the non-circular shaped valve seat passageway.

Preferably, the method further comprises the inlet port opening has a non-circular shape.

Preferably, the method further comprises the inlet port opening is generally circular with a flat side on a top side of the inlet port opening.

Preferably, the method further comprises the non-circular shaped valve seat passageway has a long axis and where the long axis is parallel to the first side.

Preferably, the method further comprises the first side is opposite the second side.

Preferably, the method further comprises the valve seat has a wall thickness between an outer edge of the valve seat and the non-circular shaped valve seat passageway and where the wall thickness is non-uniform.

Preferably, the method further comprises installing a valve into the fluid control body configured to seal against the valve seat and where the valve has a non-circular shape.

Preferably, the method further comprises the non-circular shaped valve seat passageway is shaped like a stadium and the stadium has a length that is at least twice as long as a width of the stadium shaped valve seat passageway.

DETAILED DESCRIPTION OF THE PREFERRED EMBODIMENT

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
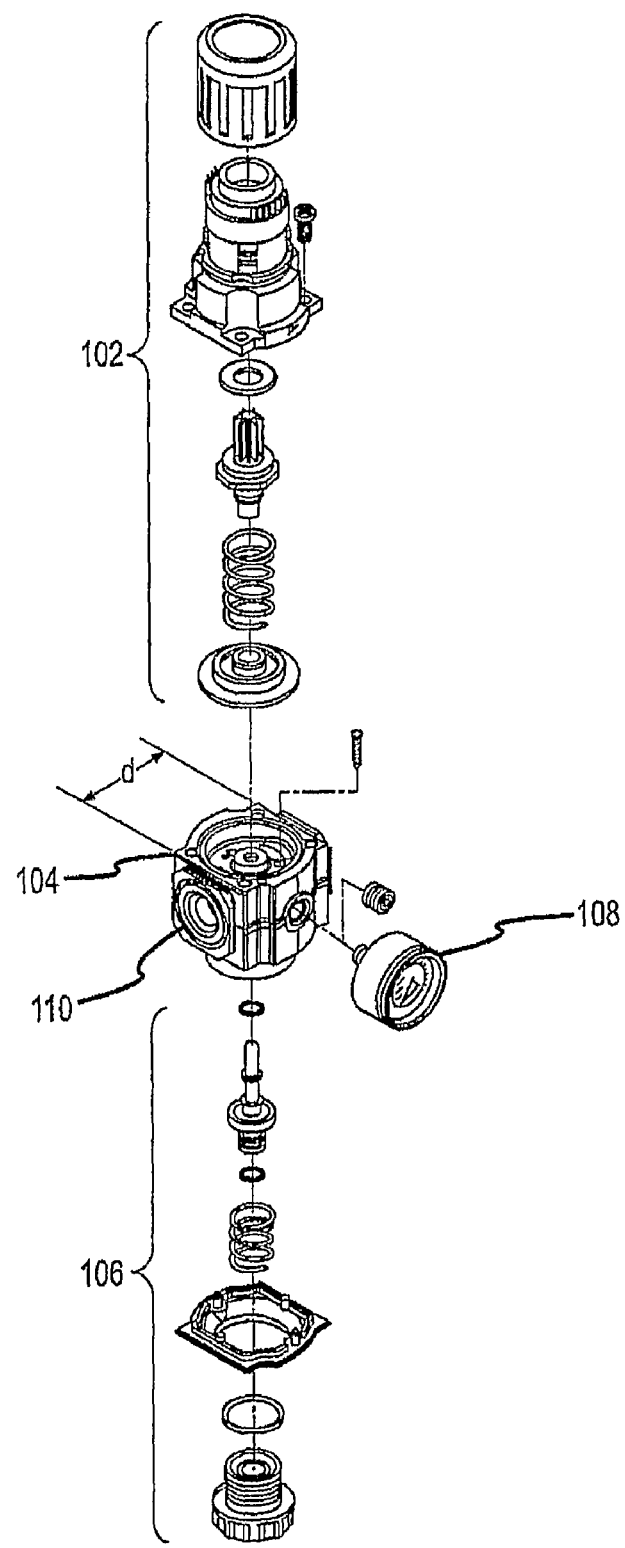
FIG. 1 is an assembly drawing of a prior art regulator.

FIG. 1 is an assembly drawing of a prior art regulator. A regulator is an example of a fluid control device. Regulator has upper regulator assembly 102, lower regulator assembly 106, body 104, and pressure gage 108. Fluid is typically introduced into regulator through inlet port 110. Upper and lower regulator assemblies 102 and 106 adjust the flow of fluid through body 104 to maintain a given pressure in an outlet port (not shown) typically on the opposite face from inlet port 110. One of the main parameters of a regulator is how much fluid can flow through body 104. Another parameter is the port-to-port distance of the regulator. The port-to-port distance is typically the distance d between the inlet port 110 and the outlet port (not shown).

Figure 2A:
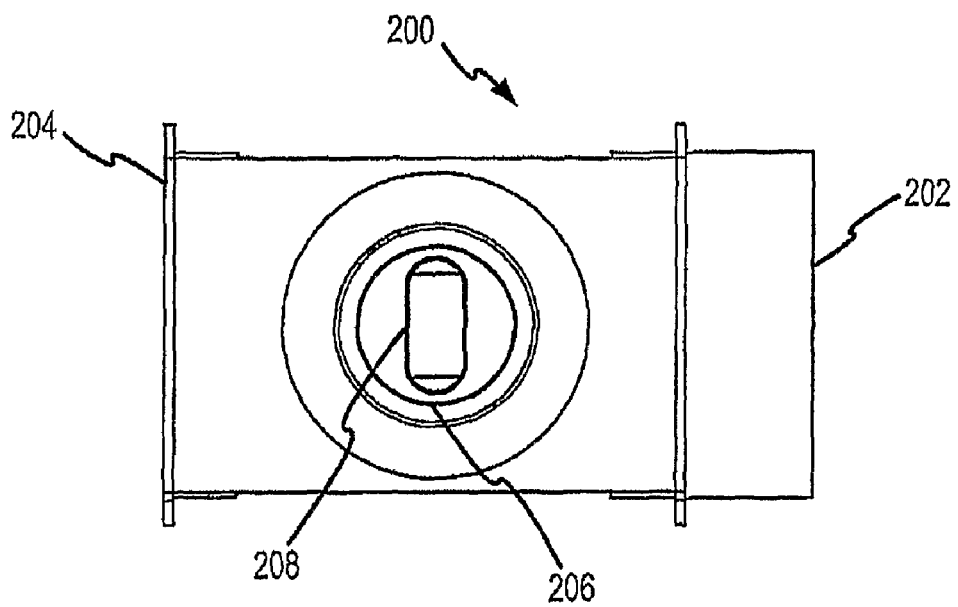
FIG. 2*a* is a side view of regulator body 200 in an example embodiment of the invention.
Figure 2B:
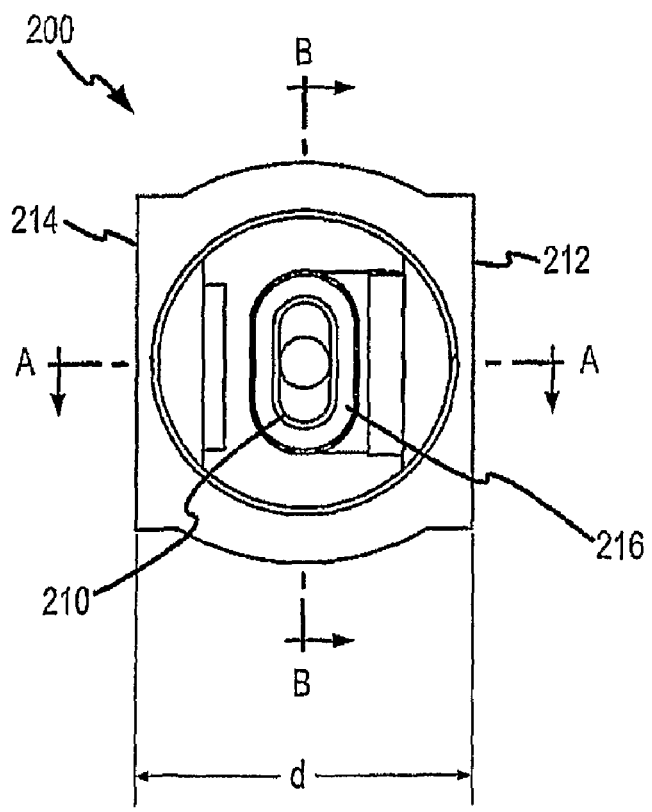
FIG. 2*b* is a bottom view of regulator body 200 in an example embodiment of the invention.

FIG. 2 is a drawing of a regulator body 200 in an example embodiment of the invention, FIG. 2a is a side view of regulator body 200 in an example embodiment of the invention. Regulator body 200 has top face 202, bottom face 204 and outlet port 206. Outlet port 206 has a non-circular shaped outlet port fluid passageway 208. FIG. 2b is a bottom view of regulator body 200 in an example embodiment of the invention. Regulator body 200 has first side 212, second side 214, non-circular valve seat passageway 210, and non-circular valve seat 216. First side 212 contains outlet port 206. Second side 214 contains inlet port (not shown). The port-to-port distance d is measured between first side 212 and second side 214. The non-circular fluid passageway 210 is oriented such that the long axis of the fluid passageway is perpendicular to the port-to-port distance d.

Figure 3:
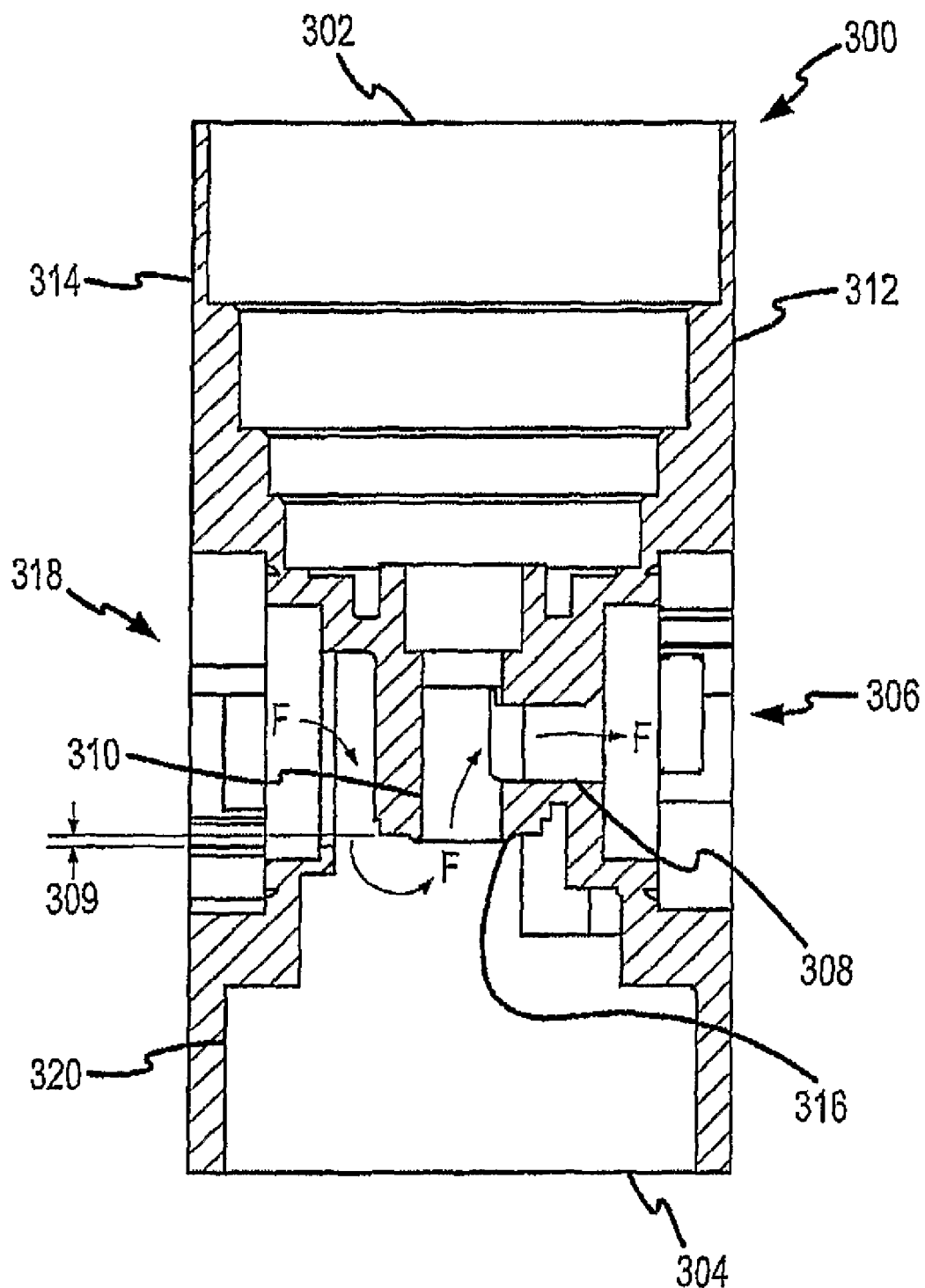
FIG. 3 is a sectional view AA of a regulator body 300 in an example embodiment of the invention.

FIG. 3 is a sectional view AA of a regulator body 300 in an example embodiment of the invention. The section for view AA is shown in FIG. 2b. Regulator body 300 has first side 312, second side 314, top face 302 and bottom face 304. Inlet port 318 is formed in second side 314. Outlet port 306 is formed in first side 312. When the regulator is open, a valve (not shown) is positioned away from valve seat 316, fluid flows from inlet port 318 into valve cavity 320, over the valve seat 316 and into non-circular valve seat passageway 310, and then through non-circular outlet port passageway 308 into outlet port 306 (as shown by arrows F). When regulator is closed, a valve (not shown) is seated against valve seat 316 thereby closing valve seat fluid passageway 310 and preventing fluid flow from valve cavity 320 into valve seat fluid passageway 310.

Figure 4B:
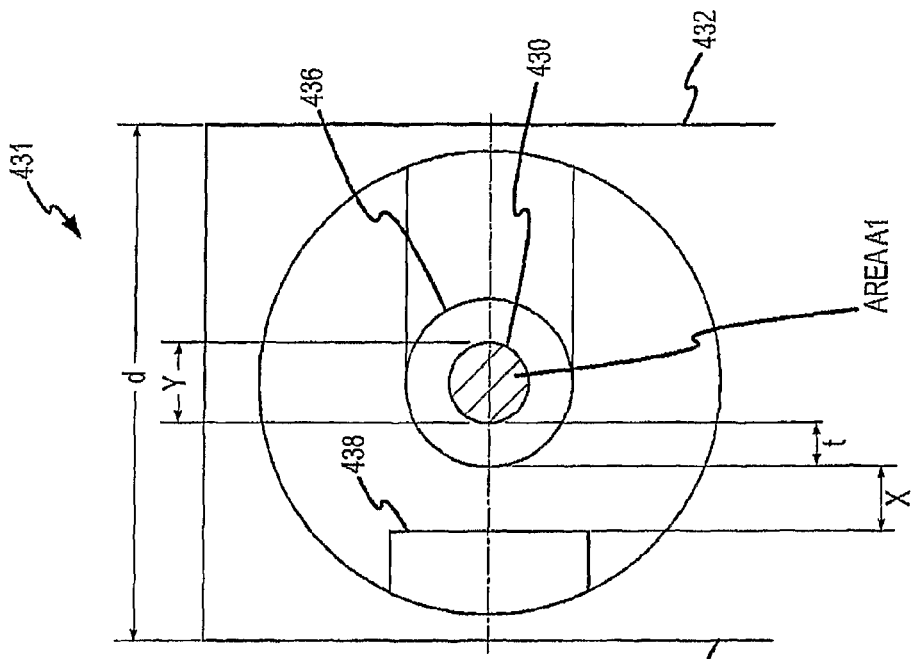
FIG. 4b is a bottom view of a prior art valve body 431.

FIG. 4b is a bottom view of a prior art valve body 431. Valve body 431 has first side 434, second side 432, valve seat 436 and circular valve seat fluid passageway 430. Inlet port 438 is on the first side 434 and the outlet port is on the second side 432. The port-to-port distance d is measured from the first side 434 to the second side 432. During operation, fluid flows from inlet port 438, over the top of valve seat 436, and into circular valve seat fluid passageway 430. The flow rate through the valve body is dependent on a number of different parameters. One of the parameters is the cross sectional area of the fluid passageways. Another one of the parameters is the shape of the flow path. In general, sharp changes in the direction of flow and longer flow lengths tend to restrict the flow rate. The cross sectional area A1 of the valve seat circular opening 430 is a function of the diameter Y of the valve seat circular opening. Valve seat 436 has wall thickness t. Wall thickness t is dependent on the type of material used for the body, the fabrication technique (molding may require a minimum thickness for material flow), the pressure range of the valve, the valve seal type, and the like. The fluid flow rate out of inlet port 438 is dependent on the cross sectional area of the inlet port opening and the distance X between the inlet port 438 and the outer edge of the valve seat 436. The port-to-port distance d is dependent on distance X, thickness t and diameter Y. Increasing the cross sectional area of circular valve seat opening 430 without changing the port-to-port distance d, would require either reducing distance X or reducing wall thickness t. Reducing distance X may restrict the flow leaving inlet port 438 and prevent an increase in overall flow through the valve. Reducing wall thickness t may have a number of different effects, for example it may require a different material, may restrict the pressure the valve is rated at, may increase cost due to a manufacturing process shift, or the like.

Figure 4A:
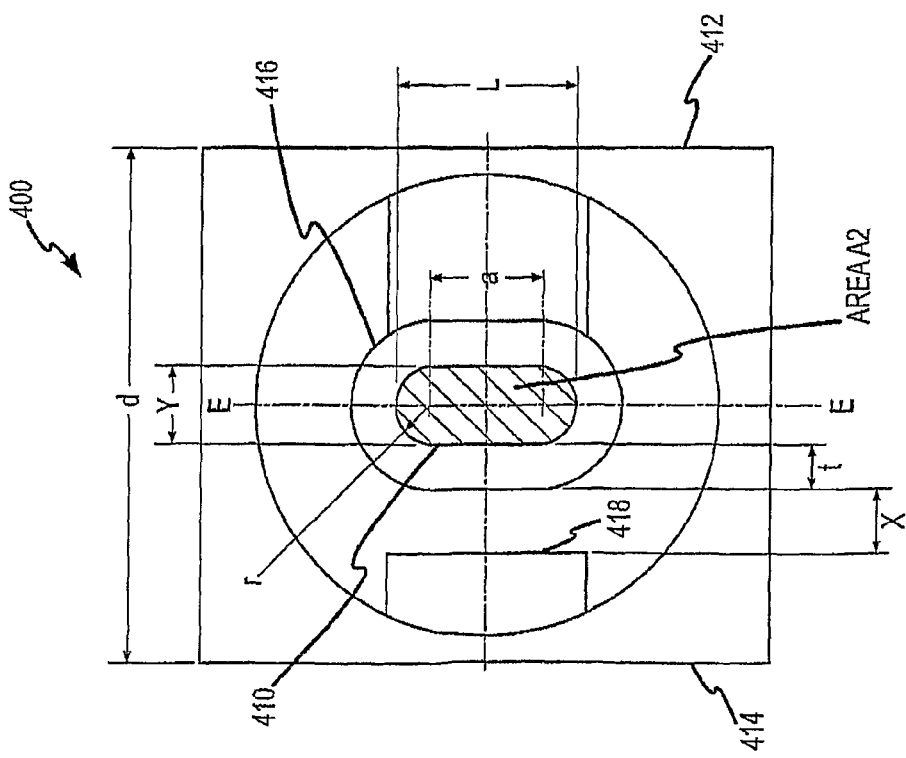
FIG. 4a is a bottom view of a valve body 400 in an example embodiment of the invention.

FIG. 4a is a bottom view of a valve body 400 in an example embodiment of the invention. Valve body 400 has first side 414, second side 412, valve seat 416 and non-circular valve seat fluid passageway 410. Non-circular valve seat fluid passageway 410 is shown shaped as a stadium. A stadium is a geometric figure consisting of a rectangle with side lengths a whose ends are capped off with semicircles of radius r. Non-circular valve seat passageway 410 has a long axis EE. Axis EE is parallel with the first 414 and second 412 sides. Inlet port 418 is on the first side 414 of body 400 and the outlet port is on the second side 412 of body 400. The port-to-port distance d is measured from the first side 414 to the second side 412. During operation, fluid flows from inlet port 418, over the top of valve seat 416, and into stadium shaped valve seat fluid passageway 410. The long axis of stadium shaped valve seat passageway 410 is perpendicular to the port-to-port distance d. Stadium shaped valve seat passageway 410 has the same distance Y as the circular valve seat opening 430. The length L is the length of the stadium passageway 410. The cross sectional area A2 of the stadium shaped valve seat passageway 410 is a function of the distance Y and the length L. When length L is greater than distance Y then area A2 will be greater than area A1. Depending on valve parameters, length L can be significantly larger than distance Y. The area of a stadium is given by $A = \pi r^2 + 2ra$ where r is the radius of the circular endcaps and a is the side lengths of the rectangular center section. For the stadium shaped valve seat opening 410, $r = \frac{1}{2}Y$ and $a = L - Y$, therefore the area $A2 = \pi(0.5Y)^2 + Y(L-Y)$. The area of circular valve seat opening A1 is $A1 = \pi$ $(0.5y)^2$. The difference delta between the two areas is delta=A2−A1=Y(L−Y). When L is two times Y, stadium shaped valve seat opening 410 has delta more area where delta=Y(2Y−Y)=Y$^2$. When L is 8 times longer than Y, the difference delta between the two areas is delta=7Y$^2$. In one example embodiment of the invention, the length L is three times the distance Y and therefore the area A2 is greater than area A1 by 2Y$^2$. When the circular valve seat opening has a 5 mm diameter and stadium shaped valve seat opening has a 15 mm length L, stadium opening will have 2Y$^2$ more area or 50 square mm more area. By creating a non-circular fluid valve seat passageway and keeping the distance Y the same as the circular valve seat opening, a larger cross sectional area can be created while keeping the port-to-port distance d, and distance X between the inlet port 418 and the valve seat wall 416, the same.

Figure 5:
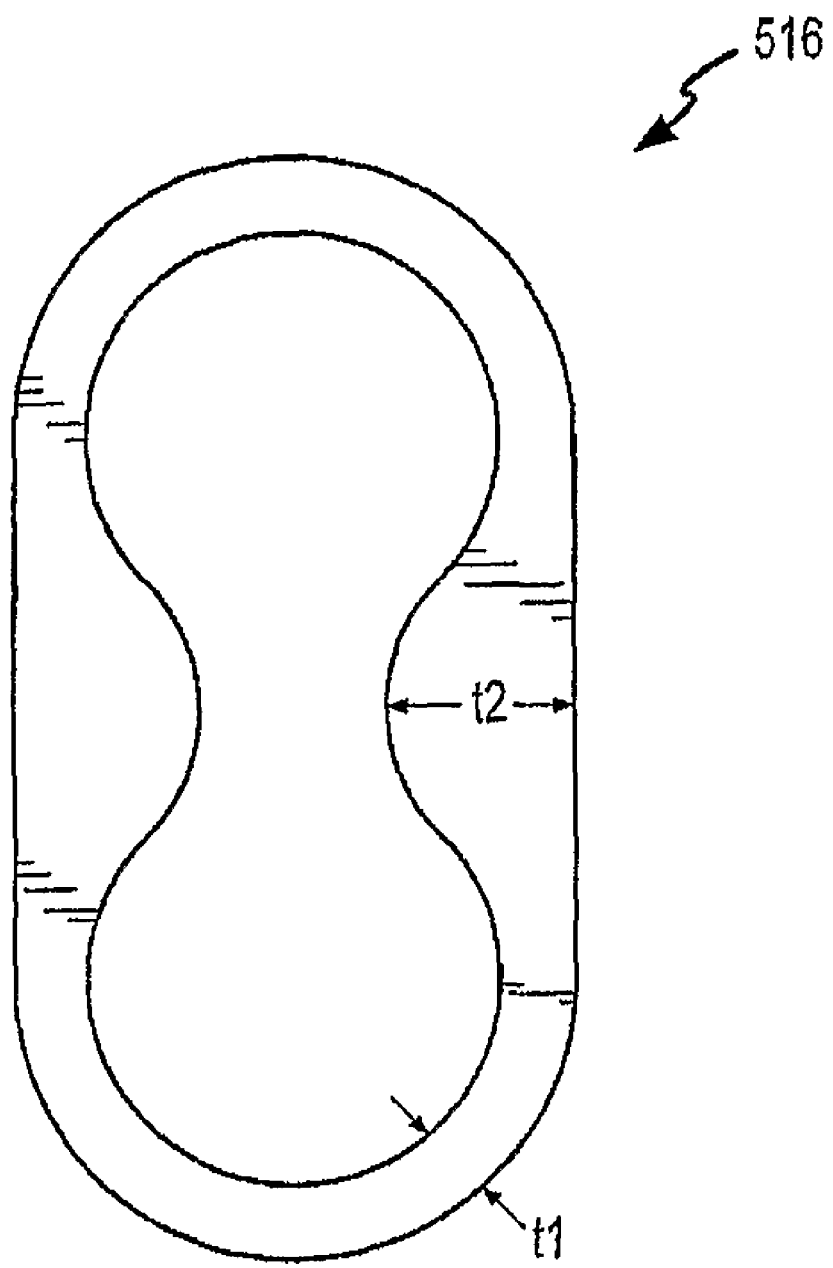
FIG. 5 is a drawing of a non-circular valve seat opening with thicker valve seat walls in an example embodiment of the invention.

Non-circular valve seat opening 410 is shown as a stadium, but any other non-circular shape may be used. Some of the shapes that may be used include: ovals, ellipses, rectangles, rounded rectangles, lenses, kidney, s-shapes, combinations of any of the shapes listed, and the like. For very high pressure applications, the wall thickness of the valve seat may be increased near the center sections of the long sides on the non-circular openings. FIG. 5 is a drawing of a non-circular valve seat opening with thicker valve seat walls in an example embodiment of the invention. Valve seat 516 has nominal wall thickness t1. The wall thickness in the center section of the non-circular shape has thickness t2. Wall thickness t2 stiffens the valve seat in the middle section of the non-circular area.

Figure 6:
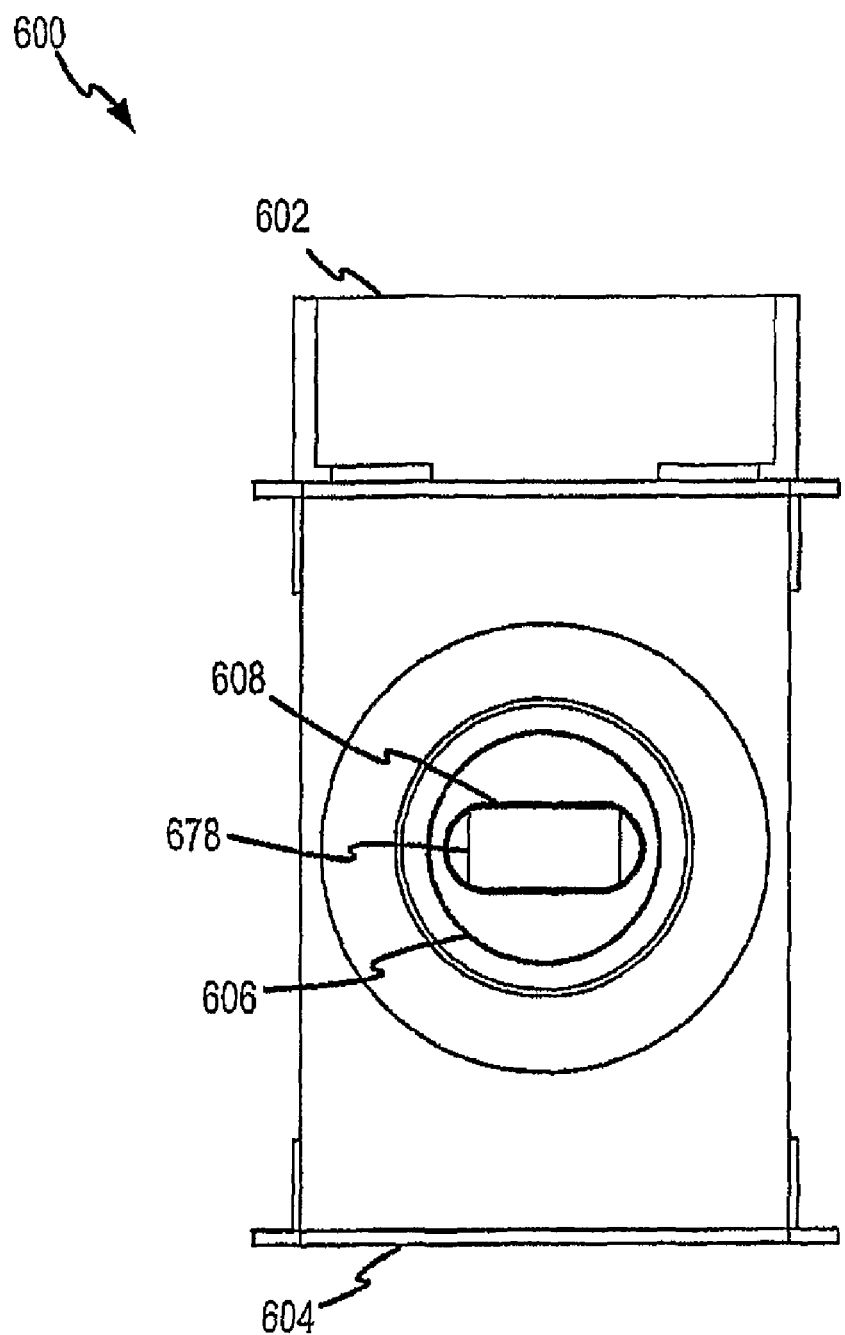
FIG. 6 is a side view of a regulator body 600 in an example embodiment of the invention.
Figure 7:
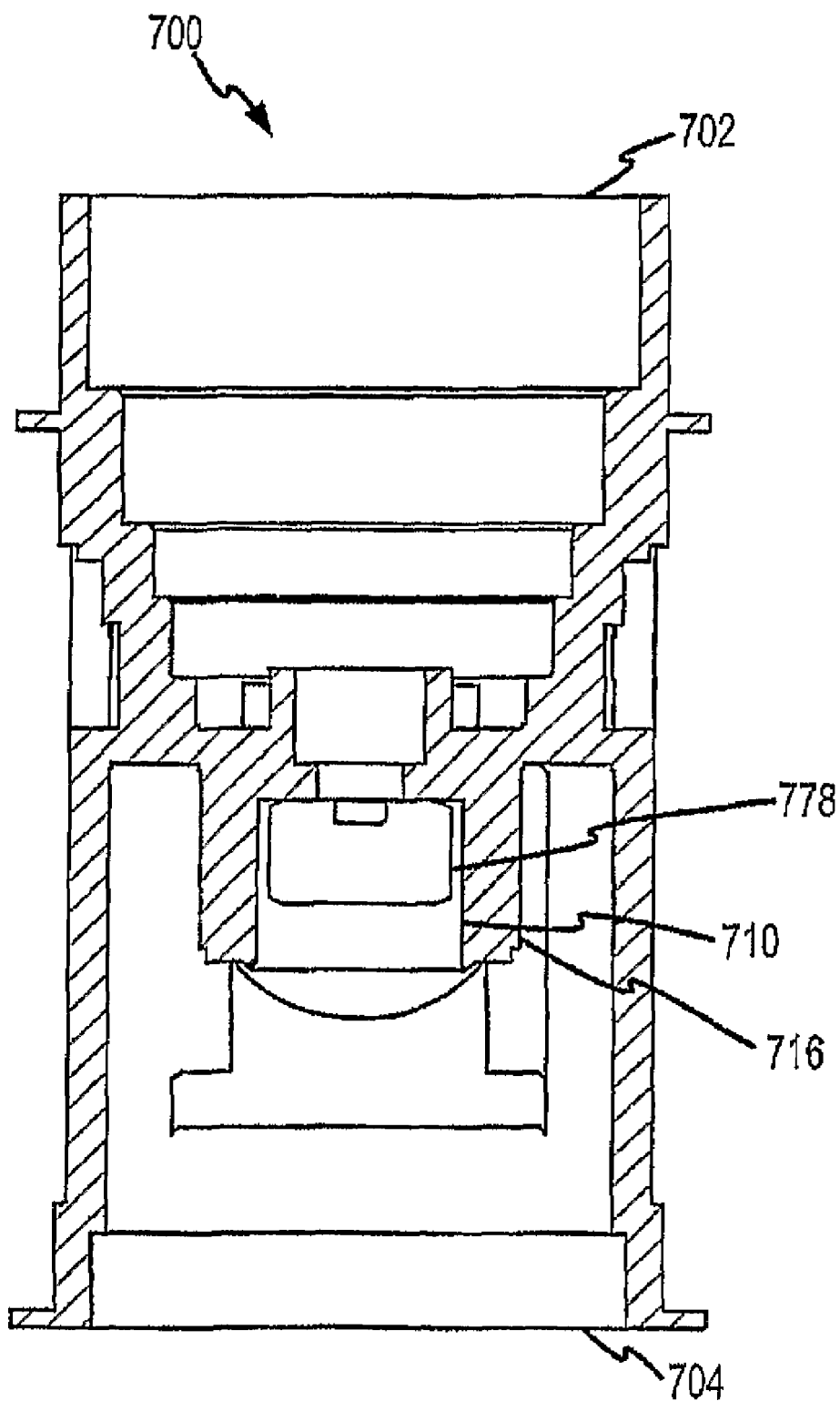
FIG. 7 is a sectional view BB of a regulator body 700 in an example embodiment of the invention.

Increasing the cross sectional area of the valve seat fluid passageway by using a non-circular opening may increase the flow through the valve if the valve seat fluid passageway was the limiting flow restriction in the valve. However if other flow restrictions are present, then increasing the cross sectional area of the valve seat fluid passageway without changing the other flow restrictions may not increase the flow through the valve. FIG. 6 is a side view of a regulator body 600 in an example embodiment of the invention. Regulator body 600 comprises a top side 602, a bottom side 604, and outlet port 606. Outlet port 606 has non-circular output port fluid passageway 608 that couples to a non-circular valve seat fluid passageway. The intersection of non-circular valve seat fluid passageway (not shown) and non-circular outlet port fluid passageway 608 form opening 678. Opening 678 is a somewhat rounded rectangle. FIG. 7 is a sectional view BB of a regulator body 700 in an example embodiment of the invention. The section BB for FIG. 7 is taken from FIG. 2b. Regulator body 700 comprises top side 702, bottom side 704, valve seat 716 and non-circular valve seat fluid passageway 710. The intersection of non-circular valve seat fluid passageway 710 and non-circular outlet port fluid passageway (not shown) form opening 778. Opening 778 is a somewhat rounded rectangle.

Figure 8:
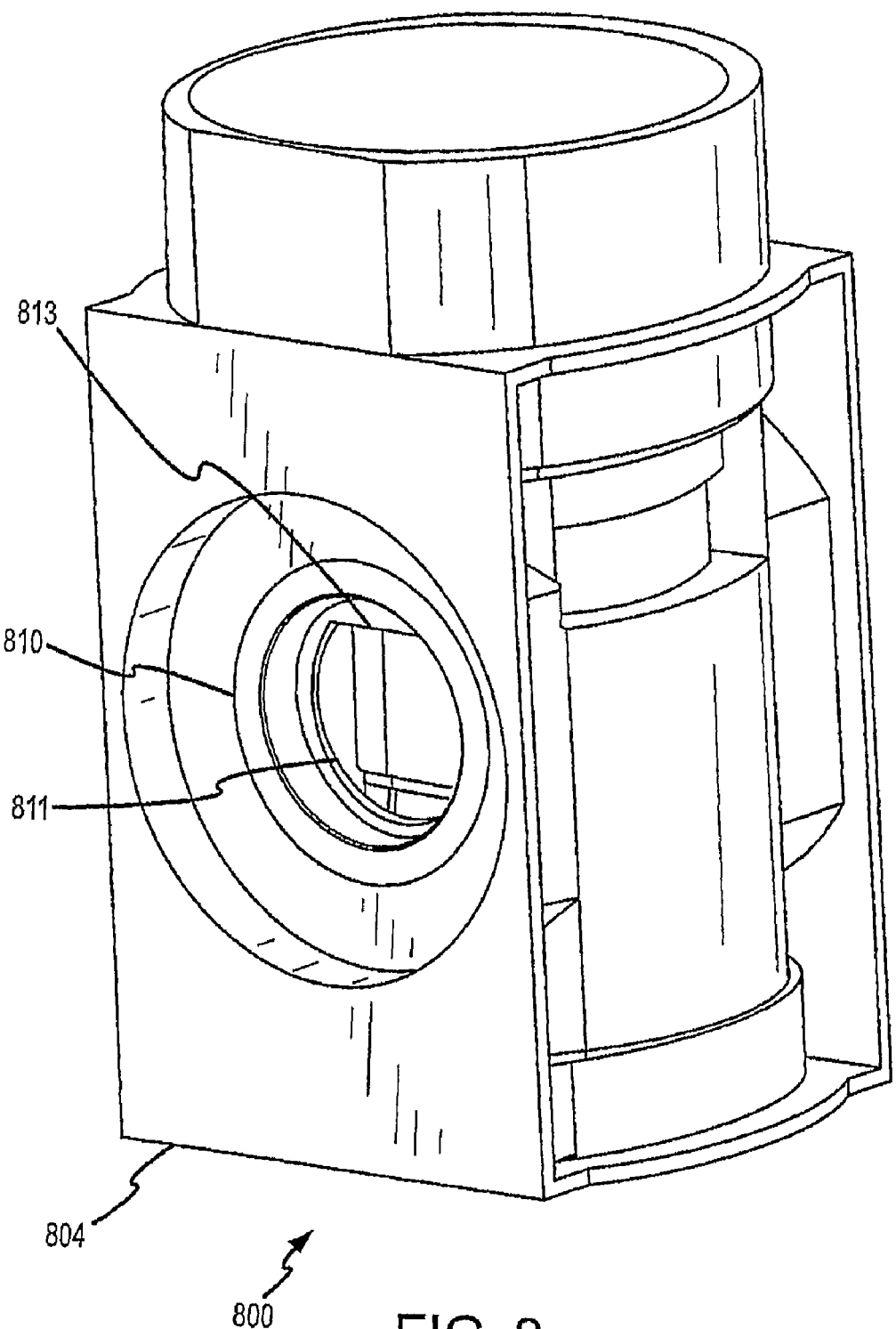
FIG. 8 is an isometric view of a regulator body 800 in an example embodiment of the invention.

FIG. 8 is an isometric view of a regulator body 800 in an example embodiment of the invention. Inlet port 810 is formed in the side of regulator body 800. Inlet port 810 has inlet opening 811. Inlet opening 811 is a generally circular shape with a flat 813 across the top of the opening. This shape is sometimes called a D shape. The round part of the D opposite the flat 813 is closer to the bottom side 804 of the regulator body 800 than a stadium shaped opening that had a long axis parallel to the bottom side 804 of the regulator body 800. By maximizing the length of the inlet opening in the direction towards the bottom of the regulator body, the distance 309 between the bottom of the inlet opening and the top of the valve seat is minimized (see FIG. 3). This minimizes the length of the flow path from the inlet opening into the valve seat passageway.

Figure 9:
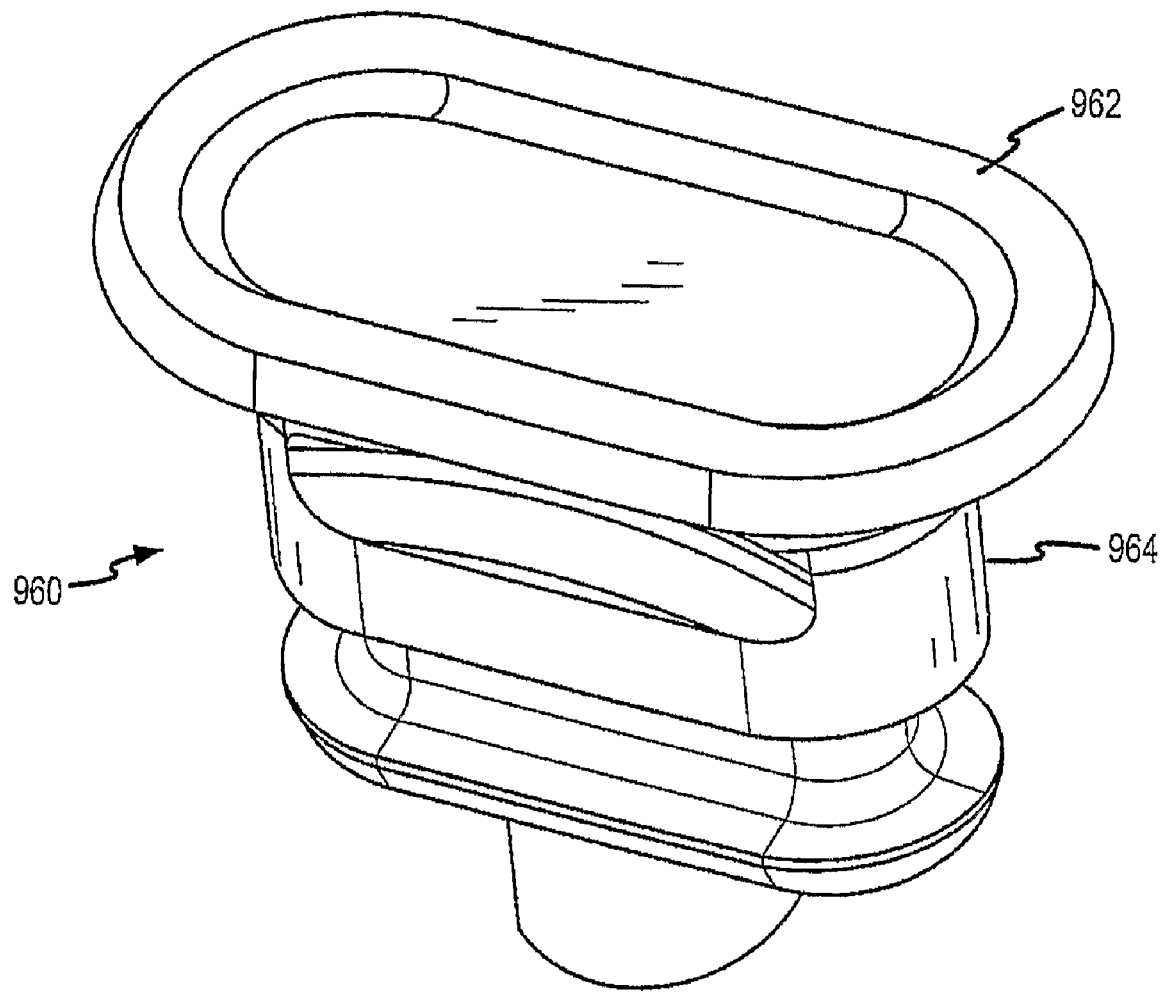
FIG. 9 is an isometric view of a valve 900 in an example embodiment of the invention.

FIG. 9 is an isometric view of a valve 960 in an example embodiment of the invention. Valve 960 has sealing surface 962 and valve body 964. Sealing surface 962 is configured to mate with a valve seat formed in the valve cavity of a regulator body. In one example embodiment of the invention, sealing surface 962 is formed in a non-circular shape that corresponds to the non-circular shape of a valve seat. In other example embodiments of the invention, sealing surface 962 may be formed as a circular shape and be configured to seal against a non-circular valve seat. In one example embodiment of the invention, valve 960 may be fabricated using a dual molding process such that sealing surface 962 is formed using a resilient material and valve body 964 is formed using a rigid material. In another example embodiment of the invention, a gasket may be used to help form a seal between sealing surface 962 and a valve seat. The gasket can be mounted on either the sealing surface 962 or the valve seat (not shown).

The invention was described above using a regulator as an example of a fluid control device. This invention is not limited to regulators, but may include other fluid control devices for example, solenoid valves, glandless valves, directional control valves, poppet valves, check valves, and the like

I claim:

1. A fluid control device, comprising:
 a fluid control body (300) having a first side (314), the first side having an inlet port (318);
 the fluid control body (300) having a bottom side (304) where the bottom side is substantially perpendicular to the first side (314) and forms a valve cavity (320) and where the inlet port (318) is coupled to the valve cavity (320) with an inlet port opening,
 the fluid control body (300) having a second side (312) where the second side (312) has an outlet port (306) providing a port-to-port distance d, between the inlet port (318) and the outlet port (306) and where the outlet port (306) is coupled to the valve seat passageway (310) with an outlet port passageway (308); and
 a valve seat (318) formed in the valve cavity (320), the valve seat (318) having a non-circular shaped valve seat passageway (310) oriented such that a long axis of the non-circular shaped valve seat passageway (310) is substantially perpendicular to the port-to-port distance, d and where the valve seat passageway couples to the valve cavity (320).

2. The fluid control device of claim 1 where the outlet port passageway (308) has a non-circular shape.

3. The fluid control device of claim 2 where the outlet port passageway (308) has generally the same shape as the non-circular shaped valve seat passageway (310).

4. The fluid control device of claim 1 where the inlet port opening has a non-circular shape.

5. The fluid control device of claim 4 where the inlet port opening is generally circular with a flat side on a top side of the inlet port opening.

6. The fluid control device of claim 1 where the first side (314) is opposite the second side (312).

7. The fluid control device of claim 1 where the valve seat has a wall thickness between an outer edge of the valve seat and the non-circular shaped valve seat passageway and where the wall thickness is non-uniform.

8. The fluid control device of claim 1 further comprising: a valve configured to seal against the valve seat.

9. The fluid control device of claim 8 further comprising: a non-circular sealing gasket configured to form a seal between the valve and the non-circular shaped valve seat passageway.

10. The fluid control device of claim 9 where the valve has a circular shape.

11. The fluid control device of claim 1 where the non-circular shaped valve seat passageway (310) is shaped like a stadium and the stadium has a length that is at least twice as long as a width of the stadium shaped valve seat passageway.

12. A method of manufacturing a fluid control device, comprising:
    forming a fluid control body having a first side, the first side having an inlet port;
    forming a valve cavity in a bottom of the fluid control body substantially perpendicular to the first side and where the inlet port is coupled to the valve cavity with an inlet port opening,
    forming an outlet port in a second side of the fluid control body where the outlet port provides a port-to-port distance d, between the inlet port and the outlet port and is coupled to the valve seat passageway with an outlet port passageway; and
    forming a valve seat in the valve cavity, the valve seat having a non-circular shaped valve seat passageway oriented such that a long axis of the non-circular shaped valve seat passageway (310) is substantially perpendicular to the port-to-port distance, d and where the valve cavity is coupled to the non-circular shaped valve seat passageway.

13. The method of manufacturing a fluid control device of claim 12 where the outlet port passageway has a non-circular shape.

14. The method of manufacturing a fluid control device of claim 13 where the outlet port passageway has generally the same shape as the non-circular shaped valve seat passageway.

15. The method of manufacturing a fluid control device of claim 12 where the inlet port opening has a non-circular shape.

16. The method of manufacturing a fluid control device of claim 15 where the inlet port opening is generally circular with a flat side on a top side of the inlet port opening.

17. The method of manufacturing a fluid control device of claim 12 where the first side is opposite the second side.

18. The method of manufacturing a fluid control device of claim 12 where the valve seat has a wall thickness between an outer edge of the valve seat and the non-circular shaped valve seat passageway and where the wall thickness is non-uniform.

19. The method of manufacturing a fluid control device of claim 12 further comprising:
    installing a valve into the fluid control body configured to seal against the valve seat and where the valve has a non-circular shape.

20. The method of manufacturing a fluid control device of claim 12 where the non-circular shaped valve seat passageway is shaped like a stadium and the stadium has a length that is at least twice as long as a width of the stadium shaped valve seat passageway.

* * * * *